US006358432B1

(12) United States Patent
Tomono et al.

(10) Patent No.: US 6,358,432 B1
(45) Date of Patent: Mar. 19, 2002

(54) COMPOSITE MAGNETIC MATERIAL AND INDUCTOR ELEMENT

(75) Inventors: Kunisaburo Tomono, Otsu; Mitsuhiro Fukushima, Shiga-ken; Hiroshi Marusawa, Moriyama; Takashi Ohsawa, Shiga-ken; Takashi Toda, Kusatsu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/697,211

(22) Filed: Oct. 26, 2000

(30) Foreign Application Priority Data

Oct. 27, 1999 (JP) .......................................... 11-305013

(51) Int. Cl.[7] ......................... C04B 35/26; H01F 1/113; H01F 21/00

(52) U.S. Cl. .................... 252/62.63; 323/362; 336/110; 428/900

(58) Field of Search ....................... 252/62.63; 428/681, 428/694 B, 900; 423/594; 323/362; 336/110

(56) References Cited

U.S. PATENT DOCUMENTS 5,077,146 A * 12/1991 Kubo et al. ................. 428/694
5,698,336 A * 12/1997 Hashimoto et al. ..... 428/694 B

FOREIGN PATENT DOCUMENTS

| | | | |
|---|---|---|---|
| JP | 03020002 | * | 1/1991 |
| JP | 10117086 | * | 5/1998 |
| JP | 2000331816 | * | 11/2000 |

OTHER PUBLICATIONS

Goryaga et al "On the nature of the magnetic anisotropy in the hexagonal ferrites Co2Y and Co2Z", Fiz. Tverd. Tela (leningrad) (1988), 30(11), 3477–9. Abstract Only.*

Xiong et al "Characterization and size–dependent magnetic properties . . . ", J. Mater. Sci (2000), 35(4), 931–936. Abstract Only.*

* cited by examiner

*Primary Examiner*—Mark Kopec
(74) *Attorney, Agent, or Firm*—Ostrolenk, Faber, Gerb & Soffen

(57) ABSTRACT

A composite magnetic material comprises a ferrite powder and a resin, in which the ferrite powder comprises a cobalt substituted Y type hexagonal ferrite ($2BaO.2CoO.6Fe_2O_3$) or cobalt substituted Z type hexagonal ferrite ($3BaO.2CoO.12Fe_2O_3$), and the permeability at 2 GHz is 90% or more of that at 1 MHz.

20 Claims, 1 Drawing Sheet

COMPOSITE MAGNETIC MATERIAL AND INDUCTOR ELEMENT

BACKGROUND OF THE INVENTION

1. Field of the Invention

The present invention relates to a composite magnetic material comprising a ferrite powder and a resin, and an inductor element constructed by using it. More specifically, it relates to a composite magnetic material and an inductor element advantageous for use in the electronic parts for high-frequency applications.

2. Description of the Related Art

In high-frequency circuits which are used for mobile communication devices including a portable telephone, a radio LAN, etc., inductor elements with a core coil structure for covering the frequencies up to several GHz, such as a chip inductor, are used for the purposes of impedance matching, resonance or for a choke.

However, the core coil was prepared by winding a wire around a core of a non-magnetic material, or by forming a coil pattern on a non-magnetic material, and thus it was necessary to have a large number of coil winding turns to obtain a desired impedance, resulting in a restraint toward the development of miniaturization. Since the resistance of the winding increases with increasing number of winding turns, there was also a problem that an inductor with a high Q (gain) could not be obtained.

To solve these problems, inductors having, as a core, a ferrite for high-frequency use, have been also investigated. By using a ferrite core, it is possible to decrease the number of coil winding turns in proportion to the permeability of the core material, and to realize miniaturization.

As a ferrite for high-frequency use described above, a hexagonal ferrite having an easy-to-magnetize axis in the c-plane is known. Such a hexagonal ferrite having an intrasurface magnetic anisotropy is generically termed as a ferrox planar type ferrite. A ferrox planar type ferrite is known to have a larger anisotropic constant in comparison with a spinel type ferrite, and have a permeability exceeding the frequency limit (the snoek peak).

However, even if a ferrox planer type ferrite sintered member (which is believed to have the most excellent high-frequency properties) is used as described above, there is a frequency relaxation phenomenon derived from magnetic domain wall motion, and a high Q can be maintained only when the frequency is restricted to a value up to about 300 MHz at the most.

SUMMARY OF THE INVENTION

Accordingly, the object of the present invention is to provide a magnetic material which has a larger permeability in comparison with a non-magnetic material in a frequency band of from several MHz to several GHz, and can maintain a relatively high gain Q up to a frequency band of several GHz.

Another object of the present invention is to provide an inductor element which can be miniaturized and still can provide a high Q, by using the magnetic material described above.

The composite magnetic material comprises a ferrite powder and a resin, and the ferrite powder comprises either a cobalt substituted Y type hexagonal ferrite ($2BaO.2CoO.6Fe_2O_3$) or a cobalt substituted Z type hexagonal ferrite ($3BaO.2CoO.12Fe_2O_3$), and the permeability at 2 GHz shows 90% or more of that at 1 MHz.

It is preferable that the composite magnetic material has a specific resistance of $10^7$ Ω.cm or more.

The composite magnetic material is suitably used as a magnetic member of an inductor.

According to the present invention, a magnetic composite material wherein the permeability does not decrease and a high Q value can be maintained up to a GHz band can be obtained, by dispersing a cobalt substituted Y type hexagonal ferrite powder or a cobalt substituted Z type hexagonal ferrite powder in a resin.

Therefore, by using this magnetic material, it is possible to provide an inductor element which can be used up to a GHz band. Thus an inductor element which is miniaturized and still has a high Q value can be realized.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
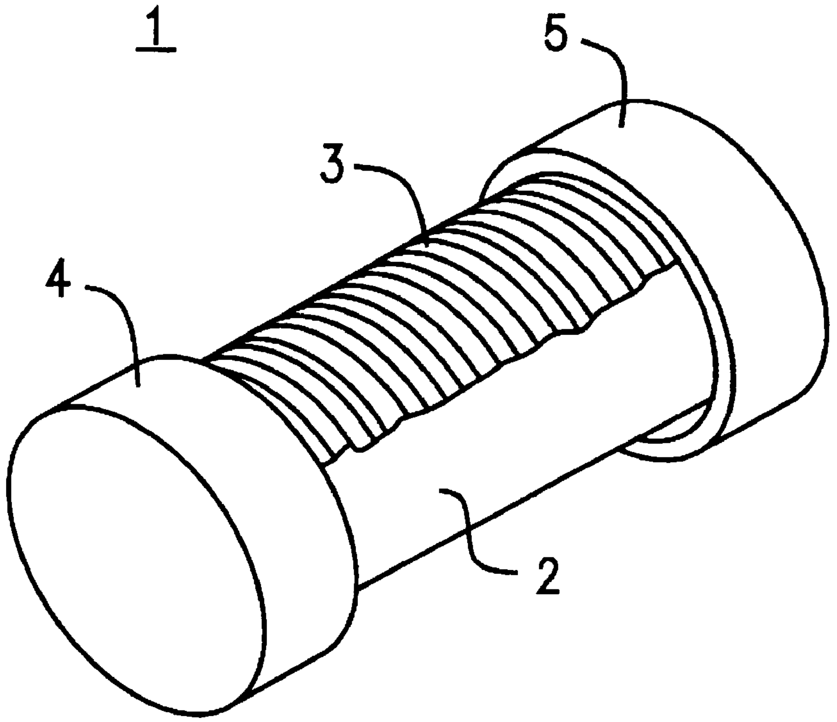
FIG. 1 is a perspective view illustrating an inductor element 1 prepared by an embodiment according to the present invention, with a part partially broken.

Hereinafter, the preferred embodiments of the present invention are explained in detail with reference to the drawing.

A ferrite sintered member material has a magnetization mechanism that it passes through magnetic domain wall motion relaxation to reach rotational magnetization resonance starting from a low frequency to a high frequency in the AC magnetic field. From a viewpoint of frequency characteristics of Q of magnetic materials, Q decreases sharply at a frequency in which magnetic domain wall motion relaxation occurs, and further decreases toward the rotational magnetization resonance point.

To maintain a high Q value up to a frequency band of several GHz, it is first necessary to stop the magnetic domain wall motion completely, and then to shift the rotational magnetization resonance frequency to a frequency which is higher than several GHz.

As a result of various researches, it was confirmed that degradation of Q by the magnetic domain wall motion can be completely stopped by dispersing a ferrite powder in a non-magnetic matrix, the powder having such a particle size that allows each of the ferrite particles to remain a single domain particle. In general, the maximum dimension of each particle in the powder will be less than about 3 $\mu$m.

The present inventors have noticed from these facts that properties which are suitable for a core for use in a high-frequency inductor can be obtained by using a composite ferrite material obtained by dispersing a ferrite powder in a resin at a high concentration, and have attained the present invention.

In other words, the present invention is directed at a composite magnetic material. This composite magnetic material is mainly characterized in that it contains a ferrite powder comprising a cobalt substituted Y type hexagonal ferrite ($2BaO.2CoO.6Fe_2O_3$) or a cobalt substituted Z type hexagonal ferrite ($3BaO.2CoO.12Fe2O_3$) dispersed in a resin.

As explained above, even a ferrox planar type ferrite can maintain a high Q only up to 300 MHz if it remains a sintered body. However, by grinding a cobalt substituted Y type hexagonal ferrite or a cobalt substituted Z type hexagonal ferrite and dispersing it in a resin according to the present invention, a high Q can be maintained up to 1–2 GHz.

Also, the composite magnetic material according to the present invention is characterized in that the permeability at 2 GHz shows a value which is 90% or more of that at 1 MHz.

Thus, when the composite magnetic material according to the present invention is applied to a high-frequency inductor element, the decline of inductance can be substantially avoided up to a GHz band.

The present invention is also directed at an inductor element equipped with a magnetic member comprising a composite magnetic material described above.

FIG. 1 is a perspective view illustrating the appearance of an inductor element 1 according to an embodiment of the present invention. In FIG. 1, the inductor element 1 is shown as partially broken.

The inductor element 1 constitutes a chip inductor, and is equipped with a cylindrical core 2. A coated winding 3 is wound over the outer periphery of the core 2. Each end of the core 2 is covered with a cap type metallic terminal member 4 or 5.

The coating of both ends of the winding 3 is peeled off and one of the ends with the coating thus peeled off is electrically connected to the terminal The member 4, and the other end is electrically connected to the terminal member 5, respectively.

The composite magnetic material according to the present invention can be used advantageously, for example, as a material for constituting a core 2 for use in the above-described inductor element 1 or as a magnetic member for use in an inductor element of a different structure.

The composite magnetic material according to the present invention contains a powder comprising a cobalt substituted Y type hexagonal ferrite ($2BaO.2CoO.6Fe_2O_3$) or a cobalt substituted Z type hexagonal ferrite ($3BaO\times2CoO\times12Fe_2O_3$), and a resin. Also, this composite magnetic material shows a permeability at 2 GHz which is 90% or more of that at 1 MHz.

It is desirable that when soldering by the reflow method is applied to an inductor element constructed with the composite magnetic material, the resin included in the composite magnetic material should be heat resistant at this reflow temperature (about 260° C).

As an example of the resin, a thermoplastic resin such as a liquid crystal polymer, polyphenylene sulfide, a polyamide, polytetrafluoroethylene, a polyimide, a polysulfone, a polyether ether ketone or a syndiotactic polystyrene, and a thermosetting resin such as an epoxy resin, a phenolic resin, a polyimide or a diallyl phthalate resin can be enumerated. The thermosetting resin may be diluted with a solvent. It is further preferred that the resin has a low dielectric constant and a low dielectric loss up to a GHz band.

Also, an additive such as a finishing agent, a dispersant or a flame retarder may be added to the composite magnetic material according to the present invention. Any additives may be used as long as they do not decrease the magnetic properties in a GHz band and do not greatly decrease the Q-value when used in an inductor.

Furthermore, regarding the addition of a finishing agent, the pretreatment with the agent may be performed to a ferrite powder. Addition by integral blending may also be employed in which it is simultaneously added when an ferrite powder is blended with a resin.

There is no limit to the method employed for preparing the cobalt substituted Y type hexagonal ferrite powder or cobalt substituted Z type hexagonal ferrite powder, and to the method employed for blending/kneading a ferrite powder with a resin, and any method may be employed as long as it does not adversely affect on the magnetic properties of a ferrite powder and a composite magnetic material.

The composite magnetic material according to the present invention will be explained below based on some examples.

EXAMPLES

Example 1

From barium carbonate ($BaCO_3$), cobalt oxide ($Co3O_4$) and iron oxide ($Fe_2O_3$) as raw materials, a cobalt substituted Z type hexagonal ferrite powder having a chemical compositional ratio of $3BaO.2CoO.12Fe_2O_3$ was prepared by wet blending these materials with a ball mill, then by baking the mixture in air at a temperature of 1,200–1,300° C., and further by wet grinding with a ball mill. A composite magnetic material was prepared by kneading this ferrite powder with the same volume of an epoxy resin.

Example 2

From barium carbonate ($BaCO_3$), cobalt oxide ($Co_3O_4$) and iron oxide ($Fe_2O_3$) as raw materials, a cobalt substituted Y type hexagonal ferrite powder having a chemical compositional ratio of $2BaO.2CoO.6Fe_2O_3$ was prepared by wet blending these materials with a ball mill, then by baking the mixture in air at a temperature of 1,000–1,200° C., and further by wet grinding with a ball mill. A composite magnetic material was prepared by kneading this ferrite powder with the same volume of an epoxy resin.

Comparative Example 1

Nickel oxide (NiO) and iron oxide ($Fe_2O_3$) as raw materials were wet blended with a ball mill. Then the mixture was baked in air at 900–1,000° C., and was further wet-ground with a ball mill. Next, the powder thus obtained was press molded, and baked in air at a temperature of 1,200–1,300° C. to prepare a spinel type ferrite sintered body having a chemical compositional ratio of $NiO.Fe_2O_3$.

Comparative Example 2

Barium carbonate ($BaCO_3$), cobalt oxide ($Co_2O_3$) and iron oxide ($Fe_2O_3$) as raw materials were wet blended with a ball mill. Then the mixture was baked in air at 1,200–1,300° C., and was further wet-ground with a ball mill. Next, the powder thus obtained was press molded, and baked in air at 1,200–1,300° C. to prepare a cobalt substituted Z type hexagonal ferrite sintered body having a chemical compositional ratio of $3BaO.2CoO.12Fe_2O_3$.

Comparative Example 3

Barium carbonate ($BaCO_3$), cobalt oxide ($Co_2O_3$) and iron oxide ($Fe_2O_3$) as raw materials were wet blended with a ball mill. Then the mixture was baked in air at a temperature of 1,000–1,200° C., and was further wet-ground with a ball mill. Next, the powder thus obtained was press molded, and baked in air at a temperature of 1,000–1,200° C. to prepare a cobalt substituted Y type hexagonal ferrite sintered body having a chemical compositional ratio of $2BaO.2CoO.6Fe_2O_3$.

Each of the ferrite samples prepared as described above according to the Examples 1 and 2, and Comparative Examples 1, 2 and 3 was subjected to the measurement of the magnetic properties by the S-parameter method and evaluation of the specific resistances. Regarding the magnetic properties, samples having a cylindrical shape with an inner diameter of 3 mm and an outer diameter of 7 mm were used and they were subjected to the measurement of real number parts $\mu'$ and imaginary number parts $\mu''$ of the complex permeabilities at frequencies of 1 MHz, 1 GHz, and 2 GHz, respectively, according to the Nicholson-Ross Weir method. Q values were calculated from both of these values.

Table 1 shows some features of the samples of Examples 1 and 2, and Comparative Examples 1, 2 and 3, as well as the permeabilities (real number parts $\mu'$ of the complex permeabilities) for the frequencies 1 MHz, 1 GHz, and 2 GHz, respectively, the Q values, and the specific resistances at the frequency 2 GHz.

TABLE 1

| | Ex. 1 | Ex. 2 | Comp. Ex. 1 | Comp. Ex. 2 | Comp. Ex. 3 |
|---|---|---|---|---|---|
| Ferrite | Cobalt substituted Z type hexagonal ferrite | Cobalt substituted Y type hexagonal ferrite | Spinel ferrite | Cobalt substituted Z type hexagonal ferrite | Cobalt substituted Y type hexagonal ferrite |
| Form of ferrite | Powder | Powder | Sintered body | Sintered body | Sintered body |
| Resin | Epoxy resin | Epoxy resin | — | — | — |
| Permeability ($\mu'$) | | | | | |
| (at 1 MHZ) | 2.5 | 2.0 | 9.7 | 10.1 | 3.0 |
| (at 1 GHz) | 2.5 | 2.0 | 3.6 | 10.1 | 3.0 |
| (at 2 GHz) | 2.5 | 2.0 | 1.8 | 3.5 | 2.5 |
| Q value (at 2 GHz) | 30 | 60 | <1 | <1 | 10 |
| Specific resistance ($\Omega \cdot$ cm) | $10^7$ | $10^7$ | $10^{10}$ | $10^6$ | $10^6$ |

As shown in Table 1, according to Examples 1 and 2, the permeability does not decrease and a high Q value can be maintained up to a GHz band. Examples 1 and 2 also show permeabilities at 2 GHz which are not less than 90% of those at 1 MHz, that is, 100%. Examples 1 and 2 also show specific resistances as large as $10^7$ Ω.cm.

While preferred embodiments of the invention have been disclosed, various modes of carrying out the principles disclosed herein are contemplated as being within the scope of the following claims. Therefore, it is understood that the scope of the invention is not to be limited except as otherwise set forth

What is claimed is:

1. A composite magnetic material comprising a resin and a ferrite powder disposed in the resin, wherein said ferrite powder comprises a cobalt substituted Y hexagonal ferrite ($2BaO.2CoO.6Fe_2O_3$) or a cobalt substituted Z hexagonal ferrite ($3BaO.2CoO.12Fe_2O_3$) of a particle size allowing each particle to remain a single domain particle in said composite magnetic material, and wherein said composite magnetic material has a permeability at 2 GHz of 90% or more of that at 1 MHz.

2. A composite magnetic material according to claim 1, having a specific resistance of $10^7$ Ω.cm or more.

3. An inductor element equipped with a magnetic member comprising a composite magnetic material according to claim 2.

4. A composite magnetic material according to claim 2, wherein the resin is selected for the group consisting of liquid crystal polymer, polyphenylene sulfide, polyamide, polytetrafluoroethylene, polyimide, polysulfone, polyether ether ketone, syndiotactic polystyrene, epoxy resin, phenolic resin, polyimide and diallyl phthalate resin.

5. An inductor element equipped with a magnetic member comprising a composite magnetic material according to claim 4.

6. A composite magnetic material according to claim 4, wherein the resin is an epoxy resin.

7. An inductor element equipped with a magnetic member comprising a composite magnetic material according to claim 6.

8. A composite magnetic material according to claim 6, wherein the ferrite is a cobalt substituted Y hexagonal ferrite.

9. An inductor element equipped with a magnetic member comprising a composite magnetic material according to claim 8.

10. A composite magnetic material according to claim 6, wherein the ferrite is a cobalt substituted Z hexagonal ferrite.

11. An inductor element equipped with a magnetic member comprising a composite magnetic material according to claim 10.

12. A composite magnetic material according to claim 2, wherein the ferrite is a cobalt substituted Y hexagonal ferrite.

13. An inductor element equipped with a magnetic member comprising a composite magnetic material according to claim 12.

14. A composite magnetic material according to claim 2, wherein the ferrite is a cobalt substituted Z hexagonal ferrite.

15. An inductor element equipped with a magnetic member comprising a composite magnetic material according to claim 14.

16. A composite magnetic material according to claim 1, wherein the ferrite is a cobalt substituted Y hexagonal ferrite.

17. An inductor element equipped with a magnetic member comprising a composite magnetic material according to claim 16.

18. A composite magnetic material according to claim 1, wherein the ferrite is a cobalt substituted Z hexagonal ferrite.

19. An inductor element equipped with a magnetic member comprising a composite magnetic material according to claim 18.

20. An inductor element equipped with a magnetic member comprising a composite magnetic material according to claim 1.

* * * * *